United States Patent
Rapp et al.

(10) Patent No.: US 8,843,840 B2
(45) Date of Patent: Sep. 23, 2014

(54) CUSTOM USER INTERFACE PRESENTATION

(75) Inventors: Peter William Rapp, Pittsburgh, PA (US); Matthew Ross Lehrian, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 404 days.

(21) Appl. No.: 12/730,938

(22) Filed: Mar. 24, 2010

(65) Prior Publication Data

US 2011/0239144 A1 Sep. 29, 2011

(51) Int. Cl.
*G06F 3/048* (2013.01)

(52) U.S. Cl.
USPC .......................... 715/765; 715/764

(58) Field of Classification Search
USPC .............................. 715/765, 764
See application file for complete search history.

(56) References Cited

U.S. PATENT DOCUMENTS

| | | | |
|---|---|---|---|
| 7,007,238 B2 | 2/2006 | Glaser et al. | |
| 8,423,889 B1 * | 4/2013 | Zagorie et al. | 715/255 |
| 2005/0273489 A1 * | 12/2005 | Pecht et al. | 709/203 |
| 2006/0217114 A1 * | 9/2006 | Chen | 455/423 |
| 2007/0159497 A1 | 7/2007 | Gur et al. | |
| 2007/0220427 A1 | 9/2007 | Briancon et al. | |
| 2009/0043804 A1 | 2/2009 | Berger et al. | |
| 2009/0044088 A1 | 2/2009 | Rapp | |
| 2009/0044089 A1 | 2/2009 | Gur et al. | |
| 2009/0044090 A1 | 2/2009 | Gur et al. | |
| 2009/0044091 A1 | 2/2009 | Gur et al. | |
| 2009/0044092 A1 | 2/2009 | Rapp | |
| 2009/0044094 A1 | 2/2009 | Rapp | |
| 2009/0044121 A1 | 2/2009 | Berger et al. | |
| 2009/0063659 A1 | 3/2009 | Kazerouni et al. | |
| 2010/0205266 A1 * | 8/2010 | Wang et al. | 709/206 |

FOREIGN PATENT DOCUMENTS

| | | | |
|---|---|---|---|
| EP | 0951709 | * 10/1998 | |
| EP | 2042985 | 4/2009 | |
| WO | WO 2009052735 | * 10/2007 | G06F 9/44 |

OTHER PUBLICATIONS

Anonymous; "How to find/display your MAC Address:Windows"; 2 pgs. (Jan. 2007); URL:http://www.coffer.com/mac_info/locate-windows.html.
International Search Report for PCT Application No. PCT/US2011/026715 dated Jun. 14, 2011, 11 pgs.

* cited by examiner

*Primary Examiner* — Peiyong Weng
(74) *Attorney, Agent, or Firm* — Fletcher Yoder PC

(57) ABSTRACT

The present disclosure relates to the generation of distinctive presentations of an interface for different devices. In this manner, the interface is presented differently on different devices. In one embodiment, the interface is customized based upon a unique sequence or identifier associated with each electronic device such that the interface is distinctive on each respective device.

19 Claims, 7 Drawing Sheets

ICCID 2152 3643 6925 7854 1265

| PARAMETER | | ICCID | ALGORITHM | COMPUTED PARAMETER |
|---|---|---|---|---|
| X-OFFSET | 0 – 99 | 2 1 | COMBINE 2 DIGITS | 21 |
| Y-OFFSET | 0 – 99 | 5 2 | COMBINE 2 DIGITS | 52 |
| ROTATION | –5° –5° | 3 6 | COMBINE 2 DIGITS; –50;/10 (36–50)/10 | –1.4° |
| HORIZONTAL FLIP | Y/N | 4 | <5 NO; >4 YES | NO |
| VERTICAL FLIP | Y/N | 3 | <5 NO; >4 YES | NO |
| SCALE | –10% –10% | 6 9 | COMBINE 2 DIGITS; –50;/5 (69–50)/5 | 3.8% |
| BRIGHTNESS | –10% –10% | 2 5 | COMBINE 2 DIGITS; –50;/5 (25–50)/5 | –5.0% |
| CONTRAST | –10% –10% | 7 8 | COMBINE 2 DIGITS; –50;/5 (69–50)/5 | 5.6% |

FIG. 7

CUSTOM USER INTERFACE PRESENTATION

BACKGROUND

The present disclosure relates generally to electronic devices, and, more particularly to the generation of a customized user interface for such an electronic device.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices of various types typically include an interface of some type that is perceived by a user. For example, different applications and operating systems may include interfaces that are displayed or otherwise presented to a user when the application or operating system is active. Such interfaces may have different aspects, including textures or graphics and/or music or audible effects used in the interface. For example, an interface may visually simulate a material, such as wood, metal, stone, and so forth, for use as a background or trim aspect of the interface. Such interfaces may be used to make an application, operating system, of other user interface more appealing to a user. Different instances of an interface, however, tend to be indistinguishable from one another.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to generating a custom presentation of an interface on different devices on which the interface is employed. For example, the appearance of all or part of a particular interface (such as a stone, wood, or metal background texture) may be varied on each device on which the interface is employed. In one embodiment, a unique sequence (e.g., an alphanumeric or numeric string) present on a device (such as a hardware serial number, license number, or stored random number) may be used to automatically generate or customize one or more parameters or aspects of the interface in question. In this manner, the interface will always be presented the same on a particular device, but will differ between devices. For example, a visual texture of all or part of an interface (such as the background, a graphic used in the interface, a frame or edge, and so forth) may be customized based on a hardware or software serial number associated with a device such that the appearance of the visual texture is customized for each device (i.e., the background texture looks different on each device). Likewise, non-visual aspects of an interface, such as audio (background music or sounds, sound effects, and so forth) or haptic components of an interface may be similarly customized. Thus, the interfaces presented on different devices may be distinguished from one another due to this customization based on a sequence or string unique to each device.

BRIEF DESCRIPTION OF THE DRAWINGS

Various aspects of this disclosure may be better understood upon reading the following detailed description and upon reference to the drawings in which:

FIG. 7 depicts one example of a unique sequence and of control logic used to parse the unique sequence to derive one or more parameters used to customize an interface feature in accordance with the present disclosure.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to customizing aspects of an interface (of an application, operating system, or other user interface) based on device specific factors, such as hardware and/or software serial numbers of other identifiers. In this manner, instances of the interface presented on different devices will be different from one another, such as having different appearances. Thus, different devices running the same interface may each present the interface differently, thereby providing users with a distinctive, if not unique, interface on each respective device.

Figure 1:
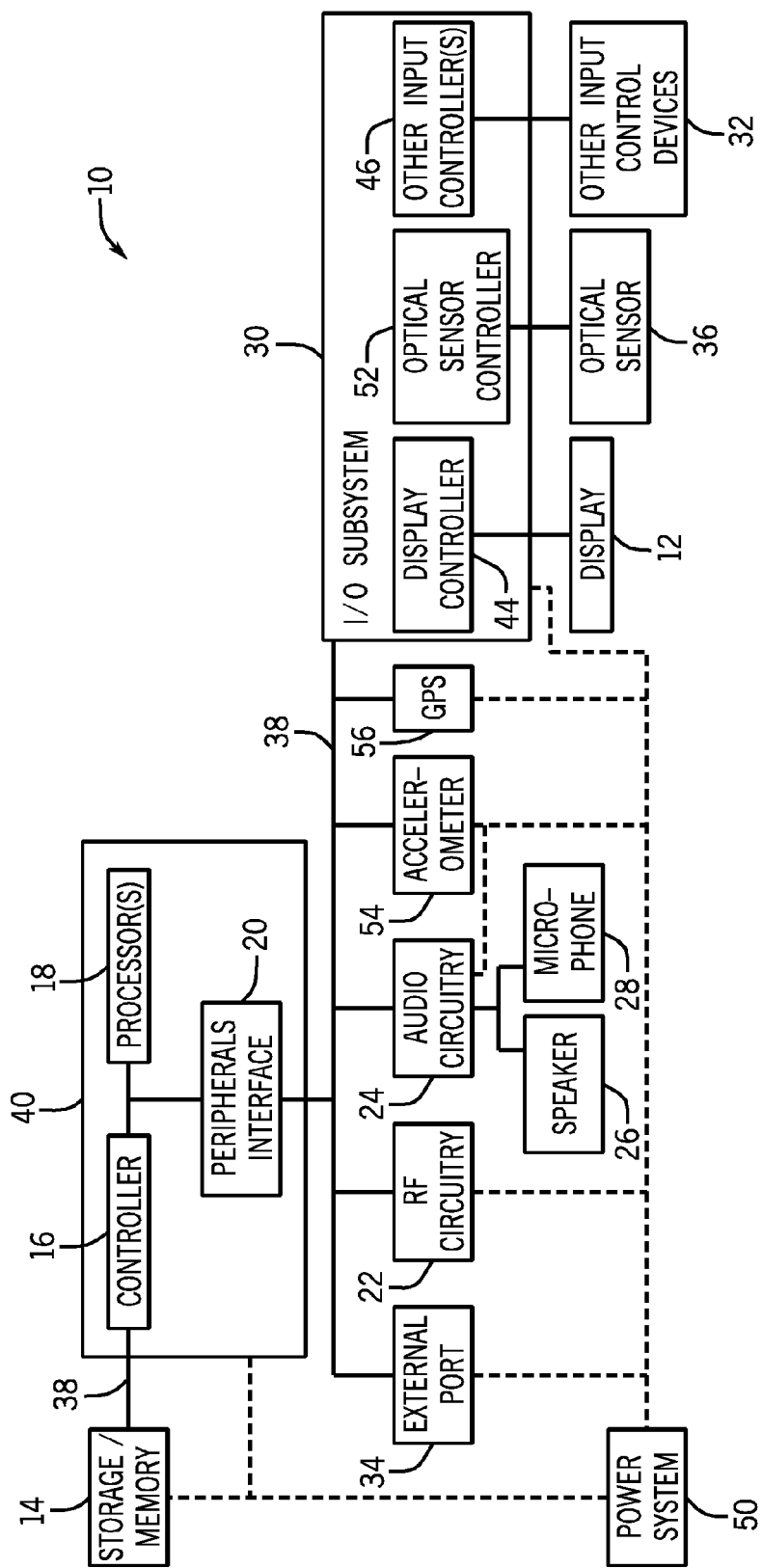
FIG. 1 is a block diagram of exemplary components of an electronic device that may be used in conjunction with aspects of the present disclosure.
Figure 2:
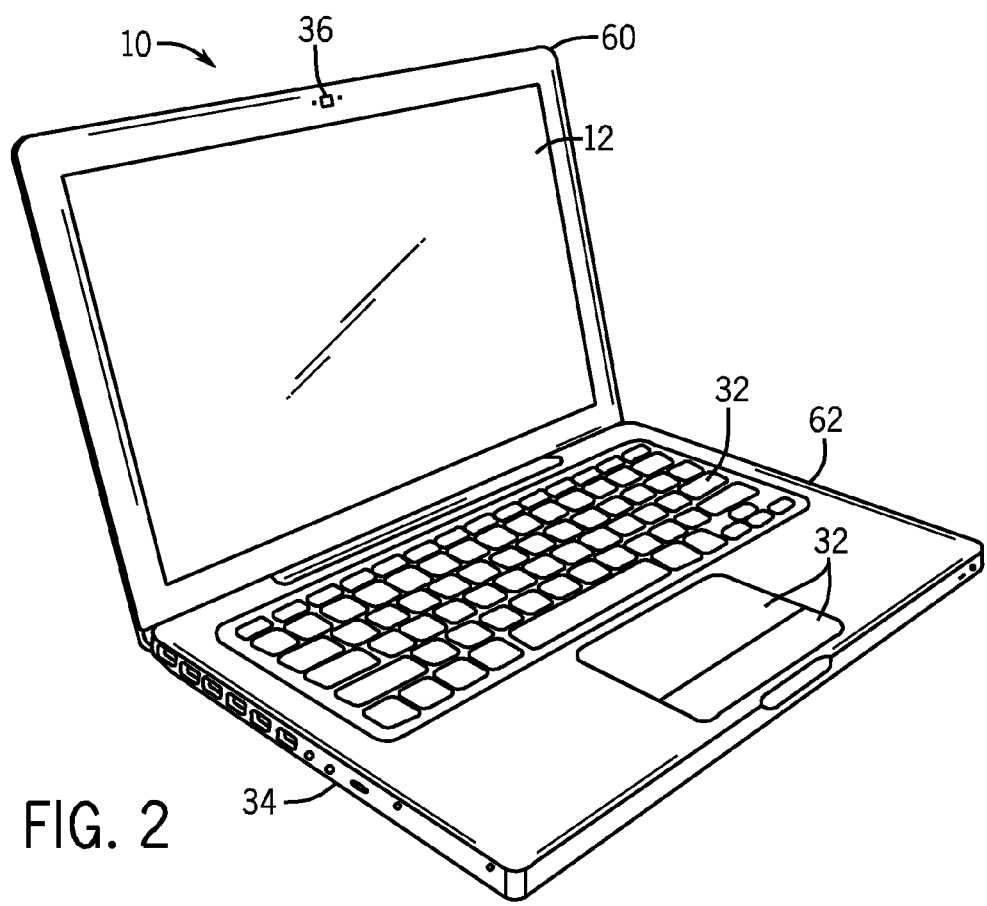
FIG. 2 is a perspective view of an electronic device in the form of a computer that may be used in conjunction with aspects of the present disclosure.
Figure 3:
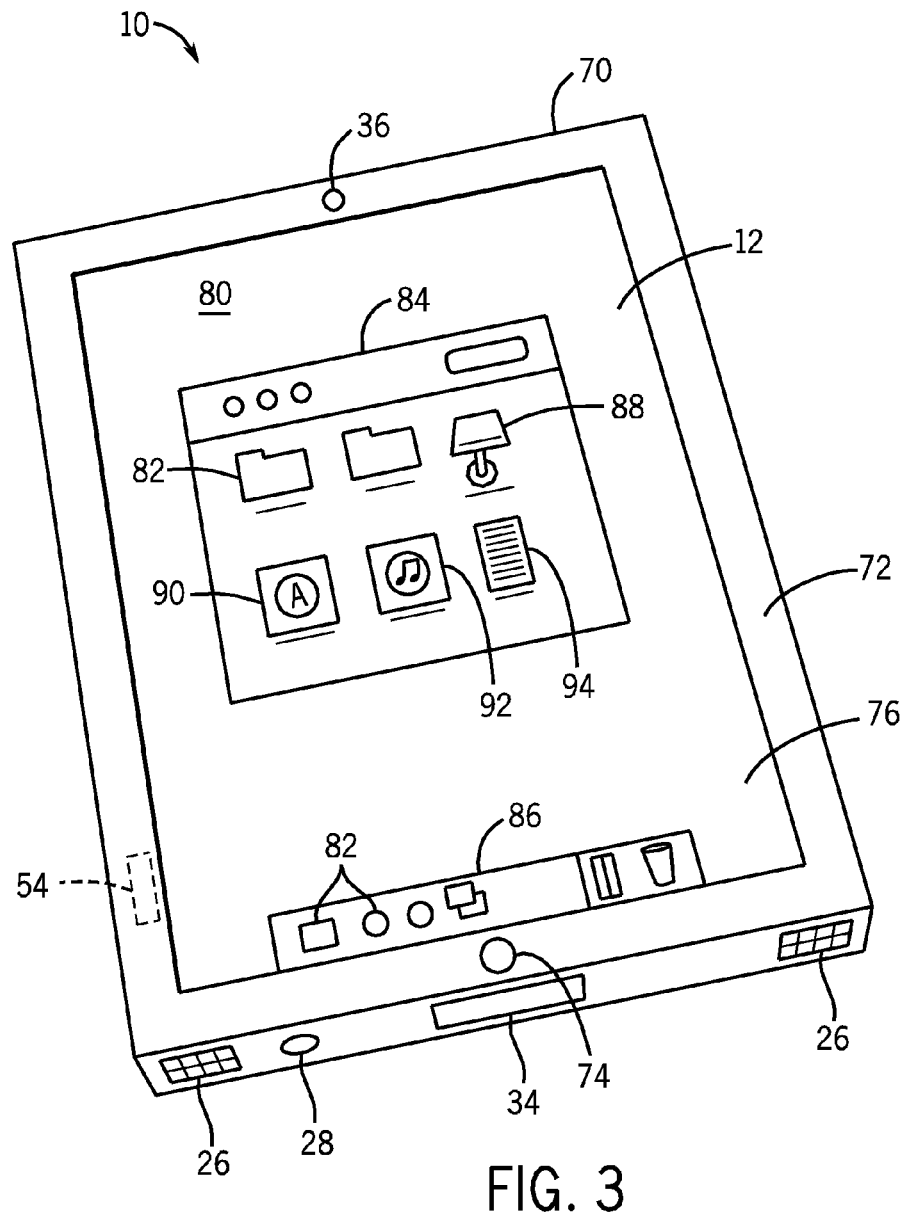
FIG. 3 is a perspective view of a tablet-style electronic device that may be used in conjunction with aspects of the present disclosure.

With these foregoing features in mind, a general description of suitable electronic devices for performing these functions is provided below. In FIG. 1, a block diagram depicting various components that may be present in electronic devices suitable for use with the present techniques is provided. In FIG. 2, one example of a suitable electronic device, here provided as a computer system, is depicted. In FIG. 3, another example of a suitable electronic device, here provided as a tablet-style device, is depicted. These types of electronic devices, and other electronic devices providing comparable display capabilities, may be used in conjunction with the present techniques.

An example of a suitable electronic device may include various internal and/or external components that contribute to the function of the device. FIG. 1 is a block diagram illustrating the components that may be present in such an electronic device 10 and which may allow the device 10 to function in accordance with the techniques discussed herein. As will be appreciated, various components of electronic device 10 may be provided as internal or integral components of the electronic device 10 or may be provided as external or connectable components. It should further be noted that FIG. 1 is merely one example of a particular implementation and is intended to illustrate the types of components and/or functionalities that may be present in electronic device 10.

In various embodiments, the electronic device 10 may be a media player, a cellular telephone, a laptop computer, a desktop computer, a tablet computer, a personal data organizer, an e-book reader (e-reader), a workstation, or the like. For example, in certain embodiments, the electronic device 10 may be a portable electronic device, such as a tablet device or a model of an iPod® or iPhone® available from Apple Inc. of Cupertino, Calif. In other embodiments, electronic device 10 may be a desktop, tablet, or laptop computer, including a MacBook®, MacBook® Pro, MacBook Air®, iMac®, Mac® Mini, Mac Pro®, iPad™ also available from Apple Inc. In further embodiments, electronic device 10 may include other models and/or types of electronic devices suitable for implementing the features disclosed herein.

As discussed herein, the electronic device 10 may be used to store and/or execute a variety of applications. Such applications may include, but are not limited to: drawing applications, presentation applications, a word processing applications, website creation applications, disk authoring applications, spreadsheet applications, gaming applications, telephone applications, video conferencing applications, e-mail applications, instant messaging applications workout support applications, photo management applications, digital camera applications digital video camera applications, web browsing applications, e-book reader applications, digital music player applications, and/or digital video player applications. Further, the electronic device 10 may be used to store, access, and/or modify data, routines, and/or drivers used in conjunction with such applications.

Various applications that may be executed on the electronic device 10 may utilize or share the same user interface devices, such as a touch-sensitive surface (e.g., a touch screen or touch pad), a mouse, a keyboard, and so forth. One or more functions of such interface devices, as well as corresponding information displayed on the electronic device 10, may be adjusted and/or varied from one application to the next and/or within a respective application. In this way, a common physical architecture (such as the interface devices provided by the electronic device 10) may support a variety of applications with user interfaces that are intuitive and transparent.

The depicted electronic device includes a display 12. In one embodiment, the display 12 may be based on liquid crystal display (LCD) technology, organic light emitting diode (OLED) technology, or light emitting polymer display (LPD) technology, although other display technologies may be used in other embodiments. In accordance with certain embodiments, the display 12 may include or be provided in conjunction with touch sensitive elements. Such a touch-sensitive display may be referred to as a "touch screen" and may also be known as or called a touch-sensitive display system.

In addition, the electronic device 10 may include one or more storage/memory components 14 (which may include one or more computer readable storage mediums), a memory controller 16, one or more processing units (CPUs, GPUs, and so forth) 18, a peripherals interface 20, RF circuitry 22, audio circuitry 24, a speaker 26, a microphone 28, an input/output (I/O) subsystem 30, input and/or control devices 32, and an external port 34. Further, in certain embodiments, the electronic device 10 may include one or more optical sensors 36. These components may communicate over one or more communication buses or signal lines 38.

It should be appreciated that the depicted electronic device 10 is only one example of a suitable device, and that the electronic device 10 may have more or fewer components than shown, may combine the functionality of two or more of the depicted components into a single component, or a may have a different configuration or arrangement of the components. Further, the various components shown in FIG. 1 may be implemented in hardware (including circuitry), software (including computer code stored on a computer-readable medium), or a combination of both hardware and software, including one or more signal processing and/or application specific integrated circuits.

With respect to the specific depicted components, the storage/memory component(s) 14 may include high-speed random access memory and/or may also include non-volatile memory, such as one or more magnetic disk storage devices, flash memory devices, or other non-volatile solid-state memory devices. Access to storage/memory components 14 by other components of the device 10, such as the processor 18 and the peripherals interface 20, may be controlled by one or more respective controllers 16, such as a memory controller, disk controller, and so forth.

The peripherals interface 20 couples various input and output peripherals of the electronic device 10 to the processor 18 and storage/memory components 14. The one or more processors 18 run or execute various software programs and/or sets of instructions stored in storage/memory components 14 (such as routines or instructions to implement the features discussed herein) to perform various functions on the electronic device 10 and/or to process data. In some embodiments, the peripherals interface 20, the processor 18, and the memory controller 16 may be implemented on a single chip, such as a chip 40. In other embodiments, these components and/or their functionalities may be implemented on separate chips.

The RF (radio frequency) circuitry 22 receives and sends RF signals, also called electromagnetic signals. The RF circuitry 22 converts electrical signals to/from electromagnetic signals and communicates with communications networks and other communications devices via the electromagnetic signals. The RF circuitry 22 may include known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 22 may communicate with networks, such as the Internet, also referred to as the World Wide Web (WWW), an intranet and/or a wireless network, such as a cellular telephone network, a wireless local area network (LAN) and/or a metropolitan area network (MAN), and/or other devices by wireless communication. The wireless communication may use any suitable communications standard, protocol and/or technology, including but not limited to Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., based upon the IMT Advanced standard), Long-Term Evolution Advanced (LTE Advanced), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), Multimedia Messaging Service (MMS), and/or Short Message Service (SMS), or any other suitable existing or later developed communication protocol.

The audio circuitry 24, the speaker 26, and the microphone 28 provide an audio interface between a user and the electronic device 10. In one embodiment, the audio circuitry 24 receives audio data from the peripherals interface 20, converts the audio data to an electrical signal, and transmits the electrical signal to the speaker 26. The speaker 26 converts the electrical signal to audible sound waves. The audio circuitry 24 also receives electrical signals converted by the microphone 28 from sound waves. The audio circuitry 24 converts the electrical signal to audio data and transmits the audio data to the peripherals interface 20 for processing. Audio data may be retrieved from and/or transmitted to the storage/memory components 14 and/or the RF circuitry 22 by the peripherals interface 20. In some embodiments, the audio circuitry 24 may include an output jack (e.g., an audio out jack or a headset jack). The output jack provides an interface between the audio circuitry 24 and removable audio input/output peripherals, such as output-only speakers, headphones or a headset with both output (e.g., a headphone for one or both ears) and input (e.g., a microphone).

The I/O subsystem 30 couples input/output peripherals on the electronic device 10, such as a display 12, and other input/control devices 32, to the peripherals interface 20. The I/O subsystem 30 may include a display controller 44 and one or more input controllers 46 for other input or control devices. The one or more input controllers 46 receive/send electrical signals from/to other input or control devices 32. The other input/control devices 32 may include physical buttons (e.g., push buttons, rocker buttons, etc.), dials, slider switches, joysticks, click wheels, a touch pad, and so forth. In some alternate embodiments, the input controller(s) 46 may be coupled to any (or none) of the following: a keyboard, infrared port, USB port, and/or a pointer device such as a mouse. Examples of input/control devices 32 in the form of buttons may include an up/down button for volume control of the speaker 26 and/or the microphone 28, on/off buttons, and/or buttons used to invoke a home screen on the display 12 of the electronic device 10.

When present, a display 12 implemented as a touch screen provides an input interface and an output interface between the electronic device 10 and a user. In one such embodiment, the display controller 44 receives and/or sends electrical signals from/to the display 12 and the corresponding touch sensitive elements. The display 12 displays visual output to the user. The visual output may include graphics, alphanumeric characters, icons, video, and so forth (collectively termed "graphics"). In some embodiments, some or all of the visual output may correspond to user-interface objects.

In embodiments employing a touch screen, the display 12 has a touch-sensitive surface, sensor or set of sensors that accepts input from the user based on haptic and/or tactile contact. The touch screen and the display controller 44 generate signals in response to contact (and any movement or breaking of the contact) on the display 12, and the signals may be received and processed in accordance with routines executing on the processor 18 such that the signals (and the contact they represent) are recognized as interactions with user-interface objects that are displayed on the display 12. In an exemplary embodiment, a point of contact between a touch screen 12 and the user corresponds to an appendage, e.g., a finger, of the user, and/or a stylus wielded by the user.

In embodiments where a touch screen is employed, the display 12 and the display controller 44 may detect contact and/or movement (or breaks in such movement) using a suitable touch sensing technologies, including but not limited to capacitive, resistive, infrared, and surface acoustic wave technologies, as well as other proximity sensor arrays or other elements for determining one or more points of contact with the display 12. The user may make contact with such a touch sensitive display 12 using any suitable object or appendage, such as a stylus, a finger, and so forth. In some embodiments, a touch-sensitive display may be multi-touch sensitive, i.e., sensitive to multiple concurrent contacts. In an exemplary embodiment, projected mutual capacitance sensing technology is used, such as that found in the iPhone® and iPod Touch® from Apple, Inc. of Cupertino, Calif.

The electronic device 10 also includes a power system 50 for powering the various components. The power system 50 may include a power management system, one or more power sources (e.g., battery, alternating current (AC)), a recharging system, a power failure detection circuit, a power converter or inverter, a power status indicator (e.g., a light emitting diode (LED)) and any other components associated with the generation, management and distribution of power in electronic devices.

The electronic device 10 may also include one or more optical sensors 36. FIG. 1 shows an optical sensor 36 coupled to an optical sensor controller 52 in the I/O subsystem 30. The optical sensor 36 may include a charge-coupled device (CCD) or complementary metal-oxide semiconductor (CMOS) phototransistors. The optical sensor 36 receives light from the environment, projected through one or more lens, and converts the light to data representing an image. In conjunction with appropriate code executing on the processor 18, the optical sensor 36 may capture still images and/or video.

The electronic device 10 may also include one or more accelerometers 54 and/or position sensing circuitry (e.g., GPS circuitry 56). By way of example, FIG. 1 shows an accelerometer 54 and GPS circuitry coupled to the peripherals interface 20. Alternately, the accelerometer 54 and/or the GPS circuitry 56 may be coupled to an input controller 46 in the I/O subsystem 30. In some embodiments, information is displayed on the display 12 in a portrait view or a landscape view based on an analysis of data received from the one or more accelerometers (e.g., based upon a position in which the electronic device 10 is presently oriented).

In some embodiments, the software components stored in storage/memory 14 may include an operating system, a communication module (or set of instructions), a contact/motion module (or set of instructions), a graphics module (or set of instructions), as well as any other suitable modules or instructions used in the operation of the device 10 or by interfaces or applications executing on the device 10. By way of example, an operating system may be based upon various software platforms, such as Darwin, RTXC, Linux®, UNIX®, Mac OS X, Microsoft Windows®, or an embedded operating system such as VxWorks, and may include various software components and/or drivers for controlling and managing general system tasks (e.g., memory management, storage device control, power management, etc.) and facilitates communication between various hardware and software components.

In addition, the software components stored in storage/memory 14 may include various applications and media (e.g., music, videos, e-books) loaded or purchased by a user of the device 10 to provide additional functionality to the device 10.

By way of example only, the storage/memory 14 may be configured to store applications and media purchased and/or downloaded from the App Store® or from iTunes®, both of which are online services offered and maintained by Apple Inc.

The communication module facilitates communication with other devices over one or more external ports 34 and also includes various software components for handling data received by the RF circuitry 22 and/or the external port 34. The external port 34 (e.g., Universal Serial Bus (USB), FireWire (IEEE 1394 High Speed Serial Bus), Ethernet port, etc.) is adapted for coupling directly to other devices or indirectly over a network (e.g., the Internet, wireless LAN, etc.). In some embodiments, the external port 34 is a multi-pin (e.g., 30-pin) connector that is the same as, or similar to and/or compatible with the 30-pin connector used on iPod® devices.

The contact/motion module may facilitate the detection and/or interpretation of contact with a touch sensitive input device, such as a touch screen, click wheel or touch pad. The contact/motion module includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts).

The graphics module includes various known software components for rendering and displaying graphics on the display 12 or other connected displays or projectors, including components for changing the intensity of graphics that are displayed. As used herein, the term "graphics" includes any object that can be displayed to a user. In some embodiments, the graphics module stores data representing graphics to be used. Each graphic may be assigned a corresponding code. The graphics module receives, from applications etc., one or more codes specifying graphics to be displayed along with, if necessary, coordinate data and other graphic property data, and then generates screen image data to output to the display controller 44.

Examples of applications that may be stored in storage/memory 14 may include work productivity applications as well as other applications. Examples of such applications may include word processing applications, image editing applications, drawing applications, presentation applications, Java-enabled applications, encryption, digital rights management, voice recognition, and voice replication.

With the foregoing discussion of the functional and structural components of an electronic device 10 in mind, FIGS. 2 and 3 depict examples of how such a device 10 may be implemented in practice. For example, FIG. 2 depicts an electronic device 10 in the form of a laptop computer 60. As shown in FIG. 2, the electronic device 10 in the form of a laptop computer 60 includes a housing 62 that supports and protects interior components, such as processors, circuitry, and controllers, among others. The housing 62 also allows access to user input devices 32, such as a keypad, touchpad, and buttons, that may be used to interact with the laptop computer 60. For example, the user input devices 32 may be manipulated by a user to operate a GUI and/or applications running on the laptop computer 60.

The electronic device 10 in the form of the laptop computer 60 also may include various external ports 34 that allow connection of the laptop computer 60 to various external devices, such as a power source, printer, network, or other electronic device. For example, the laptop computer 60 may be connected to an external projector through a cable connected to a respective external port 34 of the laptop computer 60.

In addition to computers, such as the depicted laptop computer 60 of FIG. 2, an electronic device 10 may take other forms, such as a portable multi-function device 70 (such as a cellular telephone or a tablet computing device) as depicted in FIG. 3. It should be noted that while the depicted multi-function device 70 is provided in the context of a tablet computing device, other types of portable or handheld devices (such as cellular telephones, media players for playing music and/or video, a camera or video recorder, personal data organizers, handheld game platforms, and/or combinations of such devices) may also be suitably provided as the electronic device 10. Further, a suitable multi-function device 70 may incorporate the functionality of more than one of these types of devices, such as a device that incorporates the functionality of two or more of a media player, a cellular phone, a gaming platform, a personal data organizer, and so forth. For example, in the depicted embodiment, the multi-function device 70 is in the form of a tablet computer that may provide various additional functionalities (such as the ability to take pictures, record audio and/or video, listen to music, play games, and so forth).

In the depicted embodiment, the handheld device 70 includes an enclosure or body 72 that protects the interior components from physical damage and shields them from electromagnetic interference. The enclosure may be formed from any suitable material such as plastic, metal or a composite material and may allow certain frequencies of electromagnetic radiation to pass through to wireless communication circuitry within the handheld device 70 to facilitate wireless communication.

In the depicted embodiment, the enclosure 72 includes user input structures 32 (such as the depicted button 74 and touch sensitive elements 76 incorporated into display 12 to form a touch screen) through which a user may interface with the device 70. Each user input structure 32 may be configured to help control a device function when actuated. For example, the button 74 may be configured to invoke a "home" screen or menu to be displayed. Other buttons, switches, rockers, and so forth may be provided to toggle between a sleep and a wake mode, to silence a ringer or alarm, to increase or decrease a volume output, and so forth.

In the depicted embodiment, the multi-function device 70 includes a display 12 that may be used to display a graphical user interface (GUI) 80 that allows a user to interact with the multi-function device 70. The GUI 80 may include various layers, windows, screens, templates, or other graphical elements that may be displayed in all, or a portion, of the display 12. The graphical elements may include icons 82 and other images representing buttons, sliders, menu bars, and the like. The icons 82 may be selected and/or activated via touching their locations on the display 12 in embodiments in which the display 12 is provided as a touch screen.

Generally, the GUI 80 may include graphical elements that represent applications and functions of the multi-function device 70. For instance, in the depicted embodiment, an operating system GUI 80 may include various graphical icons 82, each of which may correspond to various applications that may be opened or executed upon detecting a user selection (e.g., via keyboard, mouse, touchscreen input, voice input, etc.). The icons 82 may be displayed in a graphical dock 86 or within one or more graphical window elements 84 displayed on the screen of the display 12. By way of example only, the depicted icons 82 may represent a presentation application 88, such as Keynote® from Apple Inc., an application 90 for accessing the App Store® service from Apple Inc., an application 92 for accessing the iTunes® service from Apple Inc., as well as an e-reader/e-book application 94.

In some embodiments, the selection of a particular icon 82 may lead to a hierarchical navigation process, such that selection of an icon 82 leads to a screen or opens another graphical window that includes one or more additional icons 82 or other GUI elements. By way of example only, the operating system GUI 52 displayed in FIG. 4 may be from a version of the Mac OS® operating system, available from Apple Inc.

The multi-function device 70 also may include various external ports 34 that allow connection of the multi-function device 70 to external devices, such as computers, projectors, modems, telephones, external storage devices, and so forth. For example, one external port may be a port that allows the transmission and reception of data or commands between the multi-function device 70 and another electronic device, such as a computer. One or more of external ports 34 may be a proprietary port from Apple Inc. or may be an open standard I/O port.

With the foregoing discussion in mind, various techniques and algorithms for implementing aspects of the present disclosure on electronic devices 10 and associated hardware and/or memory devices are discussed below. For example, in certain implementations, an electronic device 10 may be employed to store and/or run one or more applications, programs, and/or operating systems that present an interface to a user. Such interfaces may include graphical, audio, haptic, or other sensory components perceived by the user. In certain embodiments of the present disclosure, aspects of such interfaces may be automatically customized or configured based on one or more sequences that are device dependent, such as unique identifiers associated with an electronic device 10. In this example, the same application, program, or operating system running on different electronic devices 10 may differ from one another due to the unique identifier associated with each respective electronic device 10 being different.

By way of example, an application running on an electronic device 10 (e.g., a computer) may present one or more windows or other graphical elements to the user. Such graphical elements may include background, foreground objects, trim bars, menu or task bars, or other perceived surfaces. For stylistic reasons, some or all of these graphical elements may be depicted in such a manner as simulate various materials, such as wood, stone, tile, leather, fur, water, metal, and so forth. For example, turning to FIG. 4, an example of a window 100 of an application is depicted. In the depicted example, the window includes trim elements 104 that simulate the appearance of a wood trim. Such a stylistic effect may be chosen or desired based on the application. For example, a musical instrument emulator application may generate different musical instrument audio effects. In such an example, when a wooden or wood based instrument, such as a piano or acoustic guitar, is selected, it may be stylistically desirable to provide a trim element 104 that simulates wood. Conversely, when a brass instrument is selected, the trim element 104 may be used to simulate brass, and so forth. Further, as will be appreciated, other elements of the interface in this example (such as the background 108 or menu/task bars 112) may be similarly treated.

In certain implementations, an image or bitmap of a texture or material may be used to create or simulate the texture on the interface elements. That is, all or part of an image file depicting the material or texture of interest, may be used to depict the texture. Alternatively, an algorithm may be used to generate a rendering simulating the texture of interest on the interface elements. Similarly, for audio interface features, a known audio clip or an algorithm may be used to generate the audio features. In conventional implementations, these approaches generate the same visual and/or audio presentation to users of devices 10 on which the interface is presented. In accordance with the approaches disclosed herein, unique aspects of each device 10 are used in the generation of certain aspects of an interface such that the interface is presented differently on different electronic devices 10.

Figure 5:
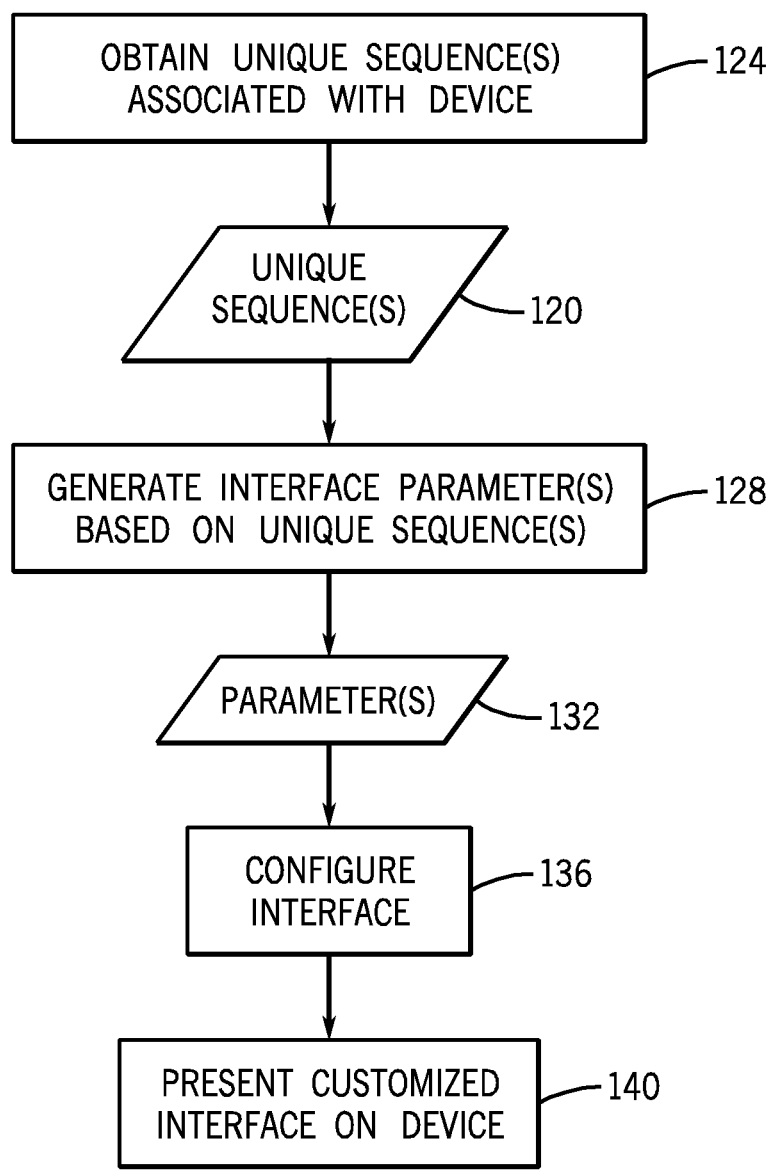
FIG. 5 depicts control logic in the form of a flow chart for generating and presenting a customized interface in accordance with the present disclosure.

For example, turning now to FIG. 5, a flowchart depicting an example of control logic used to automatically configure one or more interface parameters is provided. The parameters may each be varied over a respective range (e.g., 0 to 1, −1 to 1, 0% to 100%, and so forth), depending on the parameter in question. In certain embodiments, a parameter may be categorical in nature and may be varied over two or more categorical assignments (e.g., true/false, yes/no, north/east/south/west, and so forth). The parameters that may be varied and/or the respective range over which each parameter may be varied may be specified by the application or operating system. Further, the variables assigned to each parameter may be independent from one another or may, in certain embodiments, depend on one another or be otherwise inter-related. For example, the interface coding portions of the application may specify what parameters may be varied, the range over which each parameter may be varied, and the manner in which a value is assigned to the parameter, as discussed herein. In general, the value for each respective parameter may be generated using any suitable mathematical expression and/or statistical operation.

In certain embodiments where coherency between interface or interface elements generated on different devices is desired, it may be desirable to utilize a limited or narrow range of possible values for some or all of the parameters. In such an implementation, the desired degree of variation between interfaces or interface elements on different devices may be achieved using a suitable, large number of parameters (e.g., 10, 15, or 20 parameters) used to configure the interface or element but allowing a narrow range of values for some or all of these parameters. In this manner, coherency between the interfaces or interface elements generated on different devices may be maintained (due to the relatively narrow range of values allowed for some or all of the parameters) while the desired degree of variation may be maintained between different devices (due to the large number of parameters used to differentiate the interface or interface element).

In accordance with one implementation, a unique sequence or sequences 120 (e.g., a string of numbers, letters, and/or symbols) associated with an electronic device 10 is obtained (block 124). For example, a routine or code associated with an application or operating system stored on an electronic device 10 may be executed by a processor 18 to retrieve, read, or otherwise obtain a unique sequence 120 (e.g., a global unique identifier) associated with the device 10. Examples of such unique sequences 120 may include unique text, alphanumeric or numeric strings associated with the device 10, associated with hardware, software and/or firmware components of the device 10, and/or associated with peripherals attached to the device 10. For example, the unique sequence 120 may be a serial number of the device 10 or a component of the device 10, software or firmware license or serial numbers, an international mobile equipment identity (IMEI), a chip/smart card interface device (CCID), an Ethernet hardware ID, an integrated circuit card identifier (ICCID), and so forth.

In other embodiments, a unique sequence 120 may be generated in other ways, such as by generating a random number to be used as the unique sequence 120 when an application or operating system first loads. In such an embodiment, the unique sequence 120 may be stored on the device 10, such as on a hard disk or other non-volatile storage medium, for the life of the device or life of the application. Similarly, in an embodiment in which the device 10 has network access (e.g., Internet access) at a specified time (such as during product registration, digital rights management (DRM) signing, application installation, update installation, and so forth) prior to the initial display of the interface or interface elements in question, a unique sequence 120 may be assigned and downloaded to the device 10. In this example, a remote site, such as a server associated with the manufacture of the application or operating system in question, may store a list of pre-calculated unique sequences 120. Upon contacting the remote site over the network, a unique sequence 120 may be assigned to the device 10 and stored on the device 10 for the life of the application or device 10.

In one embodiment, all or part of the unique sequence 120 (e.g., a character or numeric string) is used to generate (block 128) one or more parameters 132 associated with a presentation of an application or operating system interface on the device 10. For example, different digits within the unique sequence 120 may be used as a value for a parameter 132 or may be used to generate such a value for the parameter 132. For instance, in certain embodiments, all or part of the unique sequence 120 may be provided as an input to a suitable algorithm, such as a hash or a random number generator, configured to generate suitable values within a specified range. The parameters 132 generated based on the unique sequence 120 may be used to configure (block 136) or initialize some aspect of the interface. In this manner, the interface is customized based on the interface parameters 132 generated using the unique sequence 120 associated with the device 10. The customized interface may then be presented (block 140) (e.g., displayed or played) on the device 10. In this manner, each instance of the interface running on a device 10 may be customized or configured based upon an intrinsic property or value associated with each respective device 10, thus making the interface as it appears on one device 10 different from how the interface appears on other devices 10.

Figure 6:
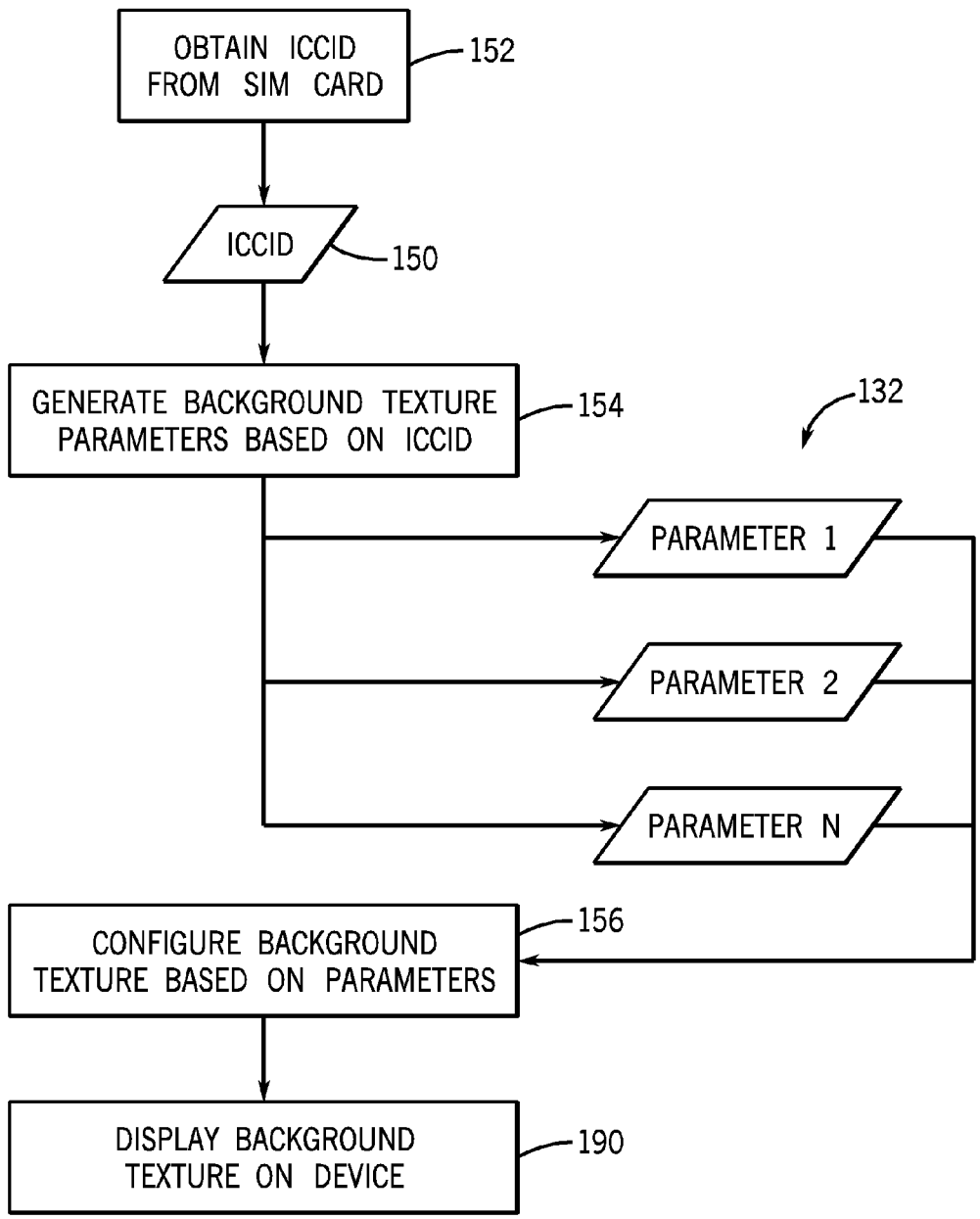
FIG. 6 depicts control logic in the form of a flow chart of one example of an algorithm for generating and presenting a customized texture in accordance with the present disclosure.

With the foregoing in mind, FIGS. 6 and 7 depict an example of an implementation in which a unique sequence 120 is used to generate parameters used to configure a visual representation on an interface element. In this example, an ICCID 150 associated with a subscriber identity module (SIM) card of a cellular telephone or other similar electronic device is used as the unique sequence 120. As depicted in FIG. 6, the ICCID 150 is obtained (block 152), such as by execution of one or more routines configured to read the ICCID number 150 from a SIM card associated with an electronic device 10. In the depicted example, as illustrated in FIG. 7, the ICCID is a twenty-digit numeric sequence. In other examples, the unique sequence might include alphabetic letters or other non-numeric characters. In such examples, digit places corresponding to letters or characters may be known and omitted from subsequent calculations used to generate interface parameters or such letters or characters may be mapped to numeric values for the purpose of generating interface parameters (e.g., "A"="1"; "B"="2"; "#"="1", and so forth).

Figure 4:
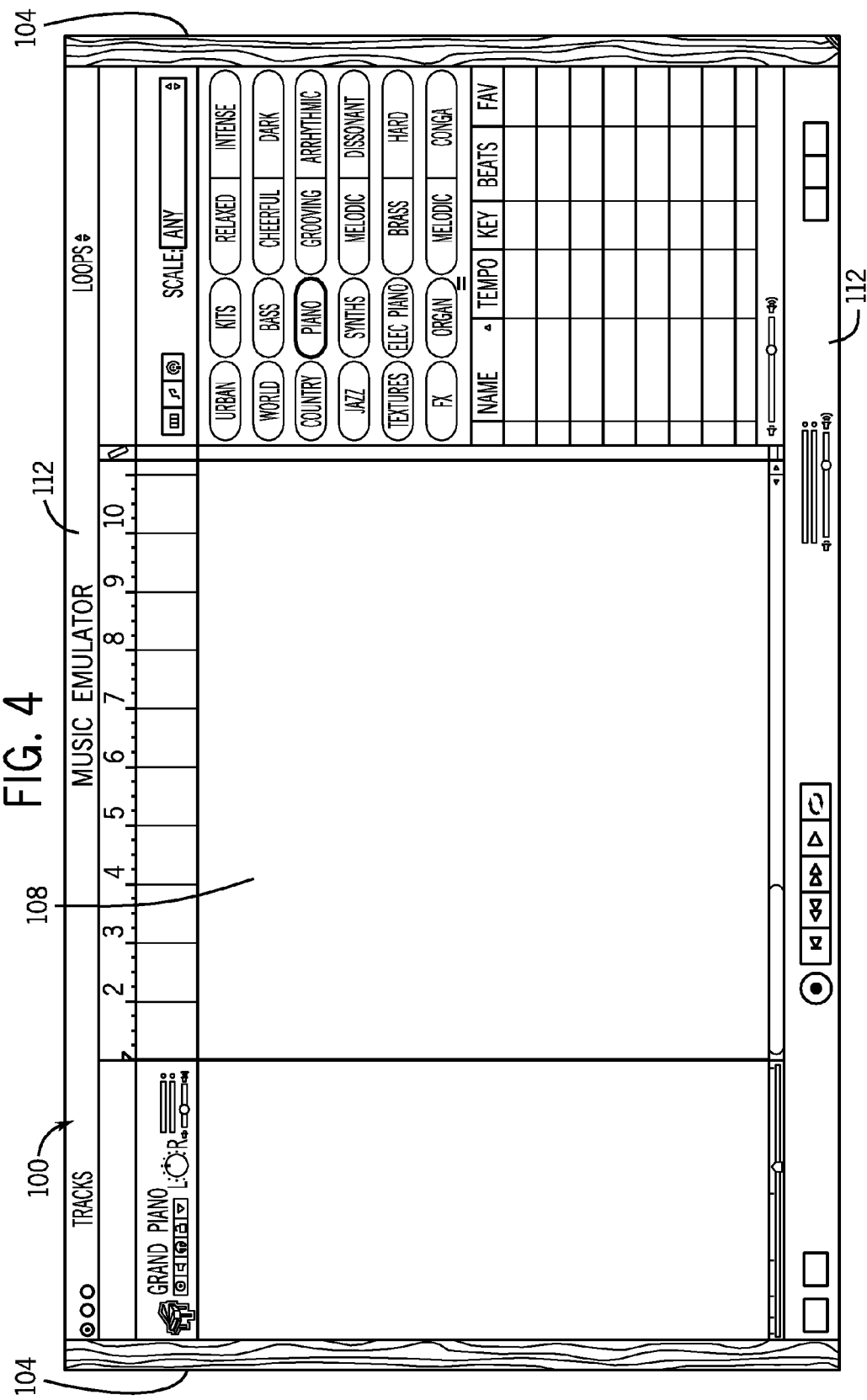
FIG. 4 depicts a screenshot having one or more customized features in accordance with the present disclosure.

In the depicted example, the ICCID 150 is used to generate (block 154) one or more parameters 132 used to configure (block 156) all or part of an interface presented to a user, such as the trim bars 104 of FIG. 4 which simulate the appearance of wood. In one embodiment, some or all of the digits of the unique sequence 120 may be mapped to specific parameters and used as values (or used to generate values) for those respective parameters. For example, with reference to FIG. 7, an X-Offset parameter 158 may be assigned a two-digit value generated by algorithmically combining the first two digits 162 (counting from the left) of the ICCID 150. That is the digits "2" and "1" may be combined to generate a value of "21" that is assigned to the X-Offset for the interface parameter in question. Similarly, the Y-Offset 164 may be assigned a two-digit value generated by algorithmically combining the first third and fourth digit (i.e., "5" and "2"→"52") of the ICCID 150.

In the example, a parameter defining rotation 166 may be assigned a value based on digits of the ICCID 150. In this example, the fourth and fifth digits (assigned values "3" and "6" respectively in the example) are used to generate a value for the rotation parameter. In the depicted example, the "3" and "6" are algorithmically combined to generate a value "36" that is then processed to subtract a value of "50" and to divide the result by a value of "10", resulting in the rotation parameter 166 being assigned a value of −1.4° based on the values in the fourth and fifth digit places of the ICCID 150. Similarly, in this example parameters such as scale 170, brightness 174, and contrast 178 may be assigned values that are algorithmically generated using values present in different respective digit places within the ICCID 150.

Further, binary or categorical parameters (e.g., YES/NO, TRUE/FALSE, RED/GREEN/BLUE, A/B/C) may be assigned values based on the ICCID 150. For instance, in the depicted example, the parameter horizontal flip 182 may be assigned a "yes" or "no" value based on the value of the number present at the seventh digit (i.e., "4") of the ICCID 150. In the depicted example, the number at the seventh digit of the ICCID 150 is algorithmically processed such that values of four or less result in a value of "no" being assigned to the horizontal flip parameter 182 while values of five or greater result in a value of "yes" being assigned to the horizontal flip parameter 182. In the depicted example, a value assigned to a vertical flip parameter 186 may be similarly derived using a different respective digit of the ICCID 150.

Once the respective parameters 132 are configured (block 156) based on the ICCID 150 (or other unique sequence 120), the interface may be displayed (block 190). In this manner, the parameters governing the appearance of an interface element may be configured differently for each device 10 on which the interface is displayed. That is, to the extent that the selected unique sequence 120 (e.g., ICCID 150) is different for each device 10, the corresponding interface element whose parameters are determined based on the unique sequence 120 will also be different on each device 10.

With the foregoing examples in mind, it will be appreciated that a variety of different parameter values may be generated in accordance with the present technique, thereby differentiating corresponding interface elements. For example, with respect to the visual interface elements that depict or simulate a wood finish, properties or parameters that may be varied and/or determined using a sequence specific to a given device may include, but are not limited to: the angle of the woodgrain cut (e.g., along the x, y, and z axes), the size of the average ribbon of wood grain, the contrast ratio between the light and dark portions of the grain, the overall brightness of the texture, the properties of the virtual lights illuminating the texture, the tint color, the amount f gnarls or knots in the wood, the specular highlight (e.g., the shininess of the polish or finish), the degree of bevel at the edges, and the waviness of the grain. As will be appreciated, the preceding examples of properties are suitable for identifying and/or modifying parameters used by an algorithm that procedurally constructs or generates a surface texture, in this example a wood texture. That is, the texture is computationally generated without reference to an underlying image or bitmap.

In other embodiments, the texture associated with the interface or interface element may instead be generated based upon a reference image or bitmap. For example, continuing with the wood texture example, an image or picture of a suitable wood material may be used to generate the texture applied to the interface or interface element being configured. In such an embodiment, parameters such as the portion of the image sampled (e.g., offset of the image from (0,0)), the rotation of the image, the vertical, and/or horizontal flipping of the image, the scale of the image, the brightness of the image, the contrast of the image, the blurring or sharpness of the image, or any other parameter typically used in image editing applications may be used to differentiate interfaces or interface elements on different devices. Similarly, various image filter parameters may be assigned values based on the present approaches. For example, parameters such as an angle, width, or sharpness associated with a dot screen, a saturation, brightness or contrast associated with a color control, a radius or angle associated with a motion blur effect, or a texture or scale associated with a glass distortion effect may be assigned values based on a unique sequence 120 as discussed herein. Likewise, in certain embodiments, multiple images may be combined, overlaid, tiled, or otherwise composited in accordance with parameters specified for the interface or interface element and parameter values populated based on a device specific sequence.

While the preceding examples generally describe visual aspects of an interface or interface elements that may be customized based upon a device or application specific factor, other aspects of an interface may also be configured similarly. For example, audio or audible interface elements and haptic or tactile interface elements may be configured using device or application factors as discussed herein. Indeed, any atmospheric element associated with an interface may be configured in accordance with the approaches discussed herein.

By way of example, in the context of an audio interface, possible interface elements may include track echo, track reverb, automatic filter, and/or AU distortion. In accordance with these examples, an interface element such as track echo may include parameters for: echo time, echo repeat, repeat color, echo volume, original volume, and so forth. An interface element such as track reverb may include parameters for: reverb time, reverb color, reverb volume, original volume, and so forth. An interface element such as automatic filter may include parameters for: frequency, resonance, intensity, mode (e.g., up, down, up and down), speed, and so forth. An interface element such as AU distortion may include parameters describing delay (e.g., delay, decay, delay mix), ring modulation (e.g., ring mod frequency 1, ring nod frequency 2, ring mod balance, ring mod mix), decimation (e.g., decimation, rounding, decimation mix), cubic polynomial (e.g., linear term, squared term, cubic term, polynomial mix), soft clip (e.g., soft clip gain), and/or mix (e.g., wet/dry mix), as well as others. Parameters such as these may be assigned values based on a device or application specific unique sequence 120, as discussed herein, such that the parameters are configured differently on different devices 10.

As discussed above, in certain embodiments a unique sequence 120 associated with the device 10 may be used to automatically customize all or part of a user interface of an application or operating system. In certain embodiments, an option may be provided to user to alter the customization or to perform subsequent alterations to the interface or interface elements customized in this manner. For example, in certain embodiments a user may select an option to alter the manner in which the customization of the interface or elements are performed. In one such example, upon user selection of such an option, the parameters associated with the interface or elements may be recalculated using a different unique sequence 120 (e.g., a different hardware serial number, software license number, random number, and so forth) or using a different mapping of the parameter values to the digits of the presently used unique sequence 120. In this manner, some degree of user input may still be incorporated into the customization process. Likewise, in certain embodiments, a user may be allowed to review and/or manipulate the parameter values generated using the approaches discussed herein to further customize or modify the presentation of an interface or interface element. In such embodiments, the interface or interface element may be initially customized automatically based on a device or application specific unique sequence 120, as discussed herein, and a user may subsequently modify or alter the customized interface or interface element.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method for generating a user interface of an application or operating system running on an electronic device, comprising:
    determining a unique sequence associated with the electronic device;
    automatically producing a customized feature of the user interface on the electronic device generated from an algorithm that uses respective portions of the unique sequence to generate respective parameters of the customized feature, wherein the customized feature comprises an aesthetic element of the user interface; and
    presenting the customized feature as part of the user interface on the electronic device;
    wherein:
        a first of the portions of the unique sequence is used to generate a respective first of the parameters, wherein the first of the parameters comprises an offset of the customized feature;
        a second of the portions of the unique sequence is used to generate a respective second of the parameters, wherein the second of the parameters comprises a rotation of the customized feature; and
        a third of the portions of the unique sequence is used to generate a respective third of the parameters, wherein the third of the parameters comprises a flip of the customized feature.

2. The method of claim 1, wherein the sequence comprises one or more of a serial number, a license number, a network hardware identifier, an international mobile equipment identity, or a chip card interface device identifier.

3. The method of claim 1, wherein the customized feature comprises a texture or bitmap displayed as part of the user interface.

4. The method of claim 1, wherein automatically producing the customized feature comprises processing an image file to produce the customized feature, according to the parameters.

5. The method of claim 1, wherein the customized feature comprises an audio component played as part of the user interface.

6. An electronic device, having a user interface, the user interface comprising:
  one or more aesthetic interface features whose presentation is generated from an algorithm that uses respective portions of a unique sequence that is directly associated with the electronic device hardware to generate respective parameters of the one or more aesthetic interface features;
  wherein the parameters comprise:
    a parameter associated with an offset of an image from a starting point;
    a parameter associated with a rotation of the image; and
    a parameter associated with a flip of the image.

7. The electronic device of claim 6, wherein the one or more interface features comprise visual features, audible features, or visual and audible features.

8. The electronic device of claim 6, wherein the sequence comprises a stored unique sequence, an identification sequence or address associated with the electronic device or a hardware component of the electronic device, or a license number associated with an application or operating system present on the electronic device.

9. The electronic device of claim 6, wherein one or more of the parameters are generated by mapping the respective digits in the sequence to the values of the parameters.

10. The electronic device of claim 6, comprising generating the unique sequence using a random number generator or hash function that uses all or a portion of another unique sequence as an input.

11. A non-transitory, computer-readable article of manufacture comprising a computer program product, the computer program product comprising routines which, when executed on a processor, perform the following:
  obtaining a sequence unique to an electronic device executing the computer program;
  generating an aesthetic feature of an interface from an algorithm that uses respective portions of the sequence unique to the electronic device to generate respective parameters of the aesthetic feature, wherein the one or more parameters comprise a parameter associated with an offset of the aesthetic feature from a starting point, a parameter associated with a rotation of the aesthetic feature, and a parameter associated with a flip of the aesthetic feature; and
  presenting the interface on the electronic device, wherein the presentation of the interface is distinct on the electronic device from its presentation on all other electronic devices executing the routines of the computer program product.

12. The computer-readable media comprising a computer program product of claim 11, wherein the act of obtaining the sequence unique to the electronic device comprises reading or acquiring a serial number associated with a hardware component of the electronic device.

13. The computer-readable media comprising a computer program product of claim 11, wherein generating the parameters comprises assigning values for the parameters based on a specified mapping between the digits of the sequence and respective parameters.

14. The computer-readable media comprising a computer program product of claim 11, wherein generating the parameters comprises using all or part of the sequence as an input to a hash function or random number generator whose output is used as values of the parameters.

15. A first electronic device comprising:
  an electronic display configured to display a user interface comprising a perceived texture; and
  one or more processors configured to produce the user interface at least in part by automatically generating one or more parameters of the texture without user selection of the one or more parameters, the one or more parameters of the texture comprising:
    a parameter associated with a waviness of a wood grain of the texture;
    a parameter associated with an angle of a cut of the wood grain of the texture;
    a parameter associated with a size of a ribbon of the wood grain of the texture;
    a parameter associated with a contrast ratio between a light and dark portion of the wood grain of the texture;
    a parameter associated with an amount of gnarls or knots in the wood grain of the texture; or
    any combination thereof;
  wherein the one or more processors are configured to determine the one or more parameters of the texture such that the texture is unique to the first electronic device as compared to all other first electronic devices.

16. A method comprising:
  determining information unique to an electronic device using a processor of the electronic device;
  manipulating an image forming a unique aesthetic element of a user interface of the electronic device, using the processor of the electronic device, by automatically generating one or more image manipulation parameters without user control over the one or more image manipulation parameters, the image manipulation parameters varying depending on the information unique to the electronic device, wherein automatically generating the one or more image manipulation parameters depending on the information unique to the electronic device causes the unique aesthetic element to be distinct to the electronic device in relation to all other electronic devices each having different respective information unique to those electronic devices; and
  displaying the unique aesthetic element of the user interface;
  wherein the one or more image manipulation parameters comprise:
    a parameter associated with an offset of the image from a starting point;
    a parameter associated with a rotation of the image; and
    a parameter associated with a flip of the image.

17. A method comprising:
  determining information unique to an electronic device using a processor of the electronic device;
  manipulating an image forming a unique aesthetic element of a user interface of the electronic device, using the processor of the electronic device, by automatically generating one or more image manipulation parameters without user control over the one or more image manipulation parameters, the image manipulation parameters varying depending on the information unique to the electronic device, wherein automatically generating the one or more image manipulation parameters depending on the information unique to the electronic device causes the unique aesthetic element to be distinct to the electronic device in relation to all other electronic devices each having different respective information unique to those electronic devices; and displaying the unique aesthetic element of the user interface;

wherein the one or more image manipulation parameters comprise:
  a parameter associated with a dot screen;
  a parameter associated with a color control; and
  a parameter associated with a motion blur effect or a glass distortion effect, or both.

18. The method of claim 1, wherein the customized feature is substantially unique to the electronic device as compared to all other electronic devices running the application or operating system.

19. A method for generating a user interface of an application or operating system running on an electronic device, comprising:

determining a unique sequence associated with the electronic device;

automatically producing a customized feature of the user interface on the electronic device generated from an algorithm that uses respective portions of the unique sequence to generate respective parameters of the customized feature, wherein the customized feature comprises an aesthetic element of the user interface; and presenting the customized feature as part of the user interface on the electronic device; wherein:

a first of the portions of the unique sequence is used to generate a respective first of the parameters, wherein the first of the parameters comprises a scale of the customized feature;

a second of the portions of the unique sequence is used to generate a respective second of the parameters, wherein the second of the parameters comprises a brightness of the customized feature; and a third of the portions of the unique sequence is used to generate a respective third of the parameters, wherein the third of the parameters comprises a contrast of the customized feature.

* * * * *